US010222301B2

(12) United States Patent
Da Silva et al.

(10) Patent No.: US 10,222,301 B2
(45) Date of Patent: Mar. 5, 2019

(54) STRUCTURAL HEALTH MONITORING SYSTEM WITH THE IDENTIFICATION OF THE DAMAGE THROUGH A DEVICE BASED IN AUGMENTED REALITY TECHNOLOGY

(71) Applicant: Embraer S.A., São José dos Campos-SP (BR)

(72) Inventors: Paulo Anchieta Da Silva, São José dos Campos (BR); Marcelo Rosa Suzuki, São José dos Campos (BR); Ricardo Rogulski, São José dos Campos (BR); Andre Koji Fujimoto Tamba, São José dos Campos (BR); Luís Gustavo Dos Santos, São José dos Campos (BR)

(73) Assignee: Embraer S.A., São José dos Campos (BR)

( * ) Notice: Subject to any disclaimer, the term of this patent is extended or adjusted under 35 U.S.C. 154(b) by 163 days.

(21) Appl. No.: 15/146,711

(22) Filed: May 4, 2016

(65) Prior Publication Data

US 2017/0322119 A1 Nov. 9, 2017

(51) Int. Cl.
*G01M 13/00* (2006.01)
*G06F 3/0481* (2013.01)
*G01M 99/00* (2011.01)
*G06K 7/10* (2006.01)

(52) U.S. Cl.
CPC ............ *G01M 99/00* (2013.01); *G01M 13/00* (2013.01); *G06F 3/04815* (2013.01); *G06K 7/10386* (2013.01)

(58) Field of Classification Search
CPC .................................................... G06T 19/006
See application file for complete search history.

(56) References Cited

U.S. PATENT DOCUMENTS

| | | | | |
|---|---|---|---|---|
| 2005/0226532 A1* | 10/2005 | Thompson | ................ | G06T 7/60 382/286 |
| 2009/0154293 A1* | 6/2009 | Sengupta | .............. | F01D 21/003 367/118 |
| 2010/0097453 A1* | 4/2010 | Endo | .................. | A61B 1/00016 348/65 |
| 2013/0335199 A1* | 12/2013 | Jonely | ................ | G06K 7/10207 340/10.5 |

(Continued)

*Primary Examiner* — Phi Hoang
(74) *Attorney, Agent, or Firm* — Nixon & Vanderhye P.C.

(57) ABSTRACT

An inspection system for assessing and visualizing structural damage to a structural platform comprises sensors operatively coupled to the structural platform that assess structural damage to or failure of the structural platform. A structural health monitoring processor operatively coupled to the sensors determines structural damage in response to the sensors. At least one RF transponder and associated reader determines the position of the structural platform relative to a user augmented reality viewing device. The user augmented reality viewing device includes a camera that captures images of the structural platform. The user augmented reality viewing device displays real world images of the structural platform and virtual indications of determined structural damage that are dependent on the position and orientation of the user augmented reality viewing device relative to the structural platform.

16 Claims, 7 Drawing Sheets

Example not limited of the SHM system integrated with the AR

(56) References Cited

U.S. PATENT DOCUMENTS

| | | | |
|---|---|---|---|
| 2015/0062123 A1* | 3/2015 | Yuen | G06T 19/006 345/420 |
| 2015/0344156 A1* | 12/2015 | Vail, III | B64F 5/0045 701/32.8 |
| 2015/0356789 A1* | 12/2015 | Komatsu | G06T 11/60 345/633 |
| 2016/0114907 A1* | 4/2016 | Schwartz | G07C 5/0808 701/33.2 |
| 2016/0238692 A1* | 8/2016 | Hill | G02B 27/017 |

* cited by examiner

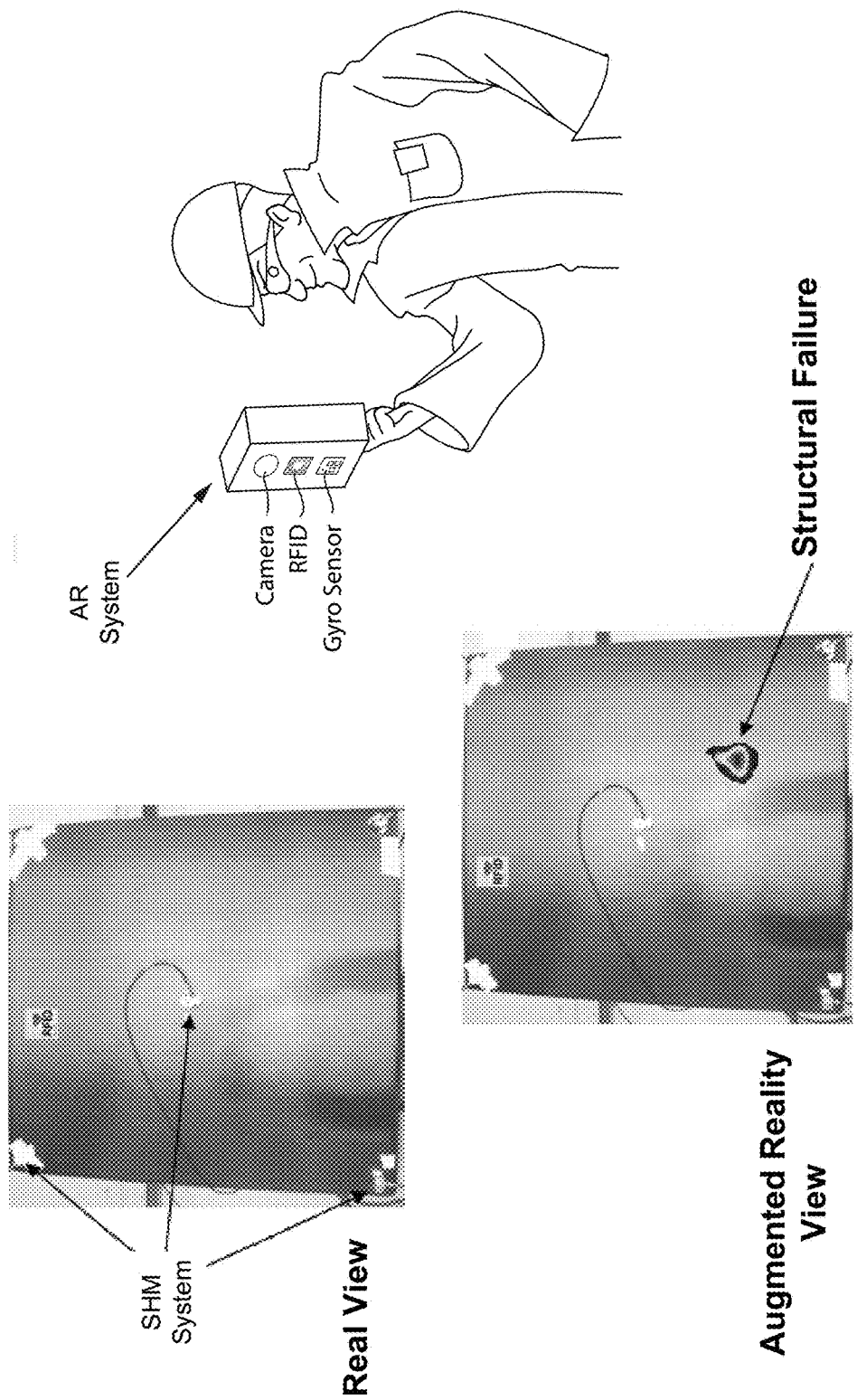
Figure 1: Example not limited of the SHM system integrated with the AR

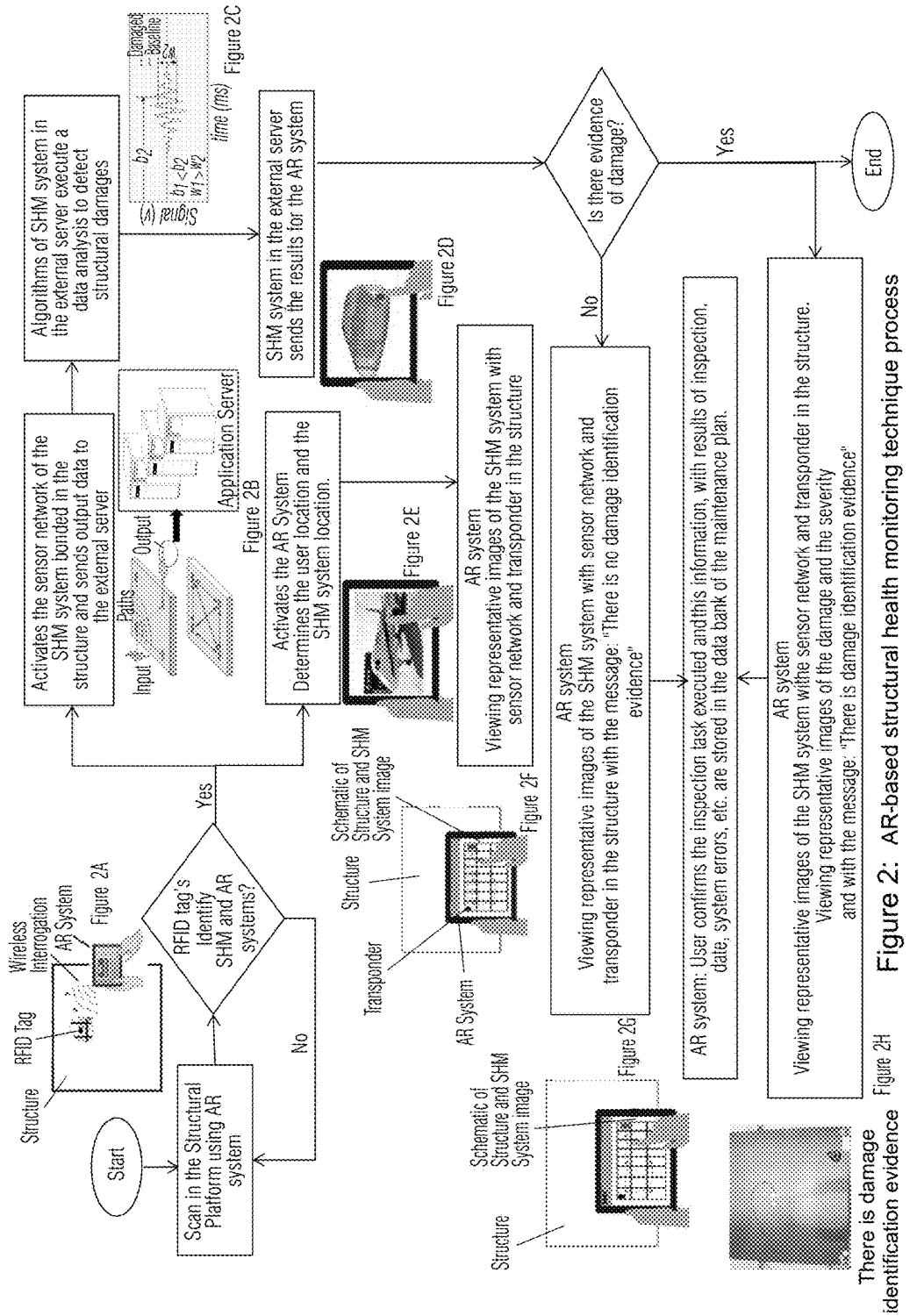
Figure 2: AR-based structural health monitoring technique process

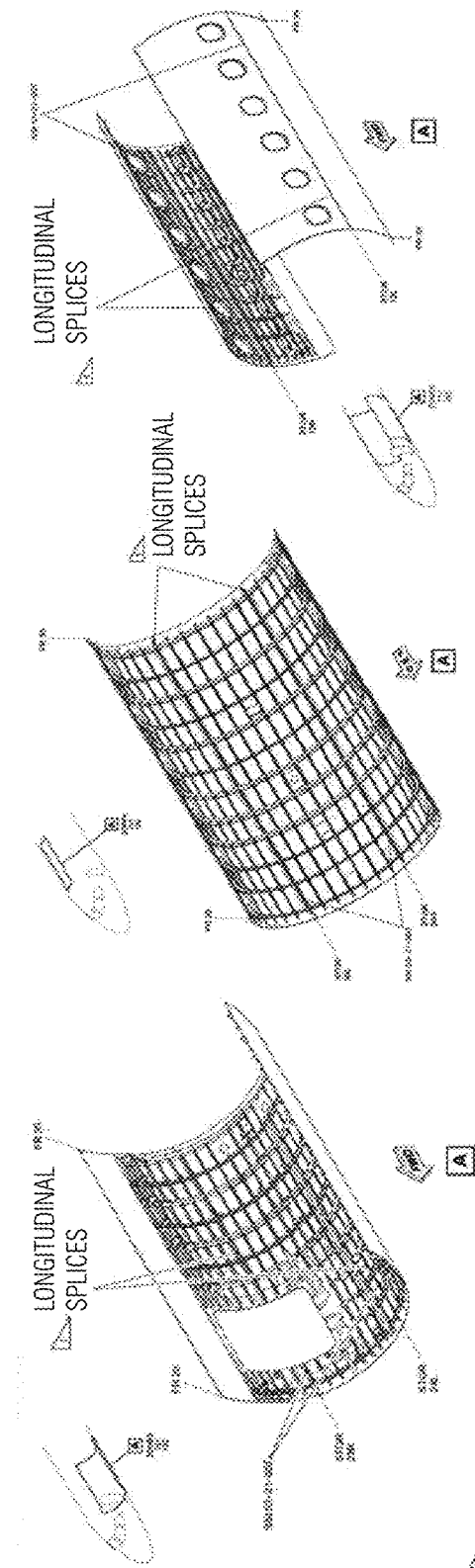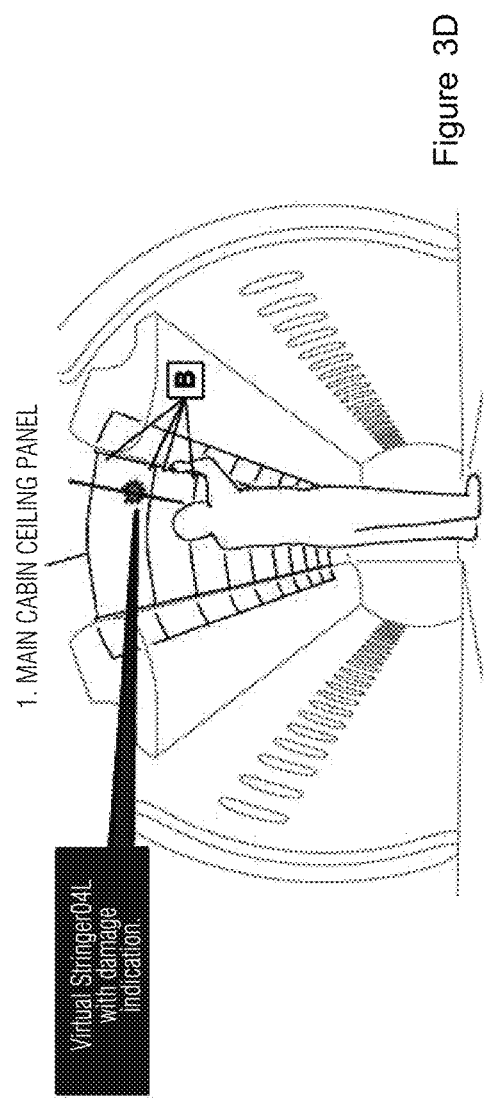
Figure 3A  Figure 3B  Figure 3C  Figure 3D

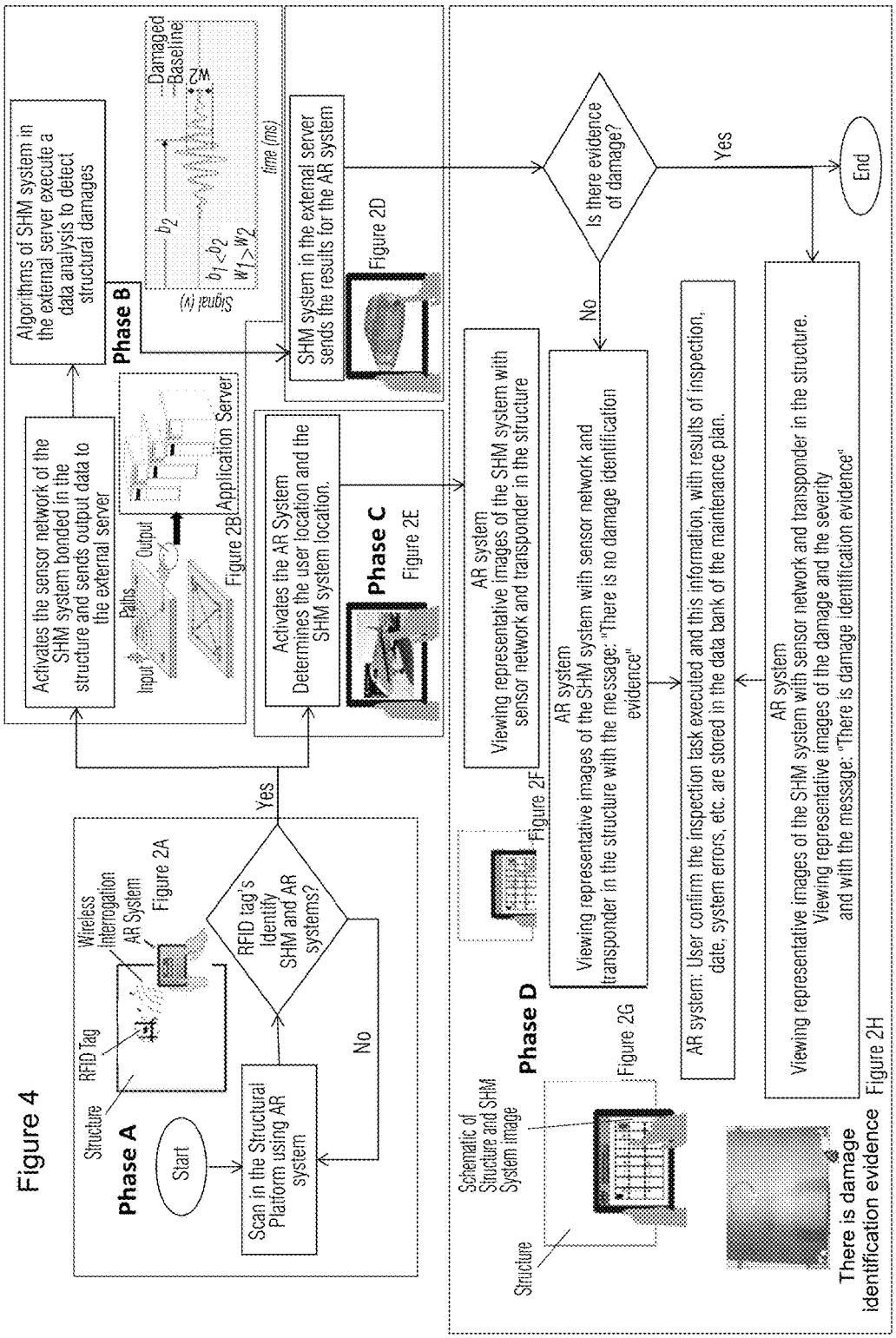

STRUCTURAL HEALTH MONITORING SYSTEM WITH THE IDENTIFICATION OF THE DAMAGE THROUGH A DEVICE BASED IN AUGMENTED REALITY TECHNOLOGY

CROSS-REFERENCE TO RELATED APPLICATIONS

None.

STATEMENT REGARDING FEDERALLY SPONSORED RESEARCH OR DEVELOPMENT

None.

FIELD

The technologies herein relate to Structural Health Monitoring (herein called "SHM") including sensors systems that automatically detect damage in structures including but not limited to aircraft.

BACKGROUND

Structural platforms are subject to conditions of use that can generate loads above those specified. These conditions, if not monitored, can induce structural damage after some service time has passed. Additionally, structural platforms are susceptible to corrosion, fatigue and accidental damage, which can be induced by service loads, environmental conditions or accidental impacts. This structural damage can be detected during scheduled maintenance, based on the maintenance plan that should be followed by operators, or during operation.

BRIEF DESCRIPTION OF THE DRAWINGS

The following detailed description of exemplary non-limiting illustrative embodiments is to be read in conjunction with the drawings, of which:

FIG. 1 shows an example non-limiting embodiment of an SHM system integrated with AR;

FIG. 2 shows an example non-limiting AR-based structural health monitoring technique process;

FIGS. 3A, 3B, 3C, 3D show comparisons between traditional detailed inspection of fuselage longitudinal splices and an equivalent inspection performed with the SHM-AR method (note the FIG. 3D virtual damage indication); and FIG. 4 shows different phases of example non-limiting operation.

DETAILED DESCRIPTION OF EXAMPLE NON-LIMITING EMBODIMENTS

Figure 2A:
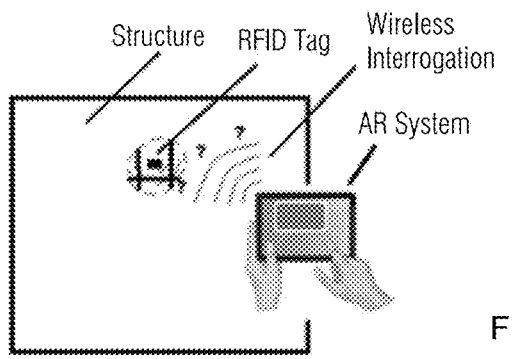
FIG. 2A shows an example identification between SHM and AR systems.

The technologies herein relate to Structural Health Monitoring (herein called "SHM") including sensor systems that automatically detect damage in structures including but not limited to aircraft. Such SHM sensors can comprise fiber optics sensors or piezoelectric sensors; sensors using Lamb waves or electromechanical impedance or fiber Bragg gratings or acoustic emission; and/or may be embedded in the structure or not embedded in the structural platform being monitored.

Example non-limiting technology herein obtains quick response of the results through use of Augmented Reality (herein called "AR") applications to improve inspection process in the maintenance actions. RFID tags installed in a SHM sensors network and in the AR mobile devices can be used to simultaneously recognize the user location and the sensor location and thus the position of the user relative to the sensor. Such relative position (which can be detected independently of markers and image recognition) can be used to display virtual objects by a handheld device such as a tablet, a headworn device such as AR goggles or glasses, or other AR viewing devices at correct positions relative to the real world structure the user is viewing, based for example on detected position and orientation of the AR viewing device and/or the user's head (which can be ascertained using an optical, accelerometer-based, gyrosensor-based, MARG, Flock of Birds, or other conventional tracking technology).

Seeking safety improvement and reduction of maintenance cost and human error, efforts are underway to develop automatic SHM (Structural Health Monitoring) systems capable of inspecting and detecting damage in real time without need for human interference. Therefore, new SHM technologies will lead to early detection of damage that usually in the past was identified only through scheduled inspections.

The development of in-service structural health monitoring (SHM) and damage detection techniques has attracted a large number of academic and industrial researchers. The ultimate goal is to monitor the integrity of a structure in operating conditions during its entire working life. The reduction of maintenance costs by minimizing explicit pre-emptory maintenance and prevention of catastrophic failures is highly desirable.

Once damage is detected in the structural platform, in general, a management process is performed through damage identification to determine whether to continue operation or to stop operation in order to perform structural repair.

Example Non-Limiting Wireless Transponders

Automatic identification can be done by wireless systems. A simple example is the transponder. The transponder is transceiver equipment that automatically responds to an interrogation signal such as an identification signal, a radar signal or a radio frequency repeater, for example.

One example of wireless identification is RFID (Radio Frequency IDentification), Near Field Communications (NFC) or Bluetooth Low Energy (BLE). Such technology provides easy and automatic identification of objects, packages, animals, people, products and other objects and things using radio waves to activate and read data storage in electronic tags for easy attachment to objects. The RFID/NFC/BLE system comprises:

Reader: Electronic equipment responsible to generate and send radio waves to interrogate, receive and process data. The reader transmits an encoded radio signal and receives back the identification signal or another information sent by tags.

Tag: Transponder responsible to answer a reader interrogation by sending data to process. RFID/NFC tags typically comprise at least two parts: (1) an integrated circuit for storing and processing information, modulating and demodulating a radio-frequency (RF) signal, collecting DC power from the reader signal; (2) an antenna for receiving and transmitting; and (3) a battery in some cases. The tag can be passive, active or battery-assisted:

Passive tags are activated by the reader and convert electromagnetic fields by reader radio waves into energy used to reply by sending an ID or other signal.

A battery-assisted passive tag has a small battery on board and when activated by the presence of an RFID reader sends back an ID signal.

An active tag has an on-board battery and periodically transmits its ID signal (can operate with passive readers or active readers such as BLE).

The communication between tags and readers can be over various frequencies divided into three classes: Low frequency, High frequency and Ultra High frequency, according to establish international standards. The frequency determines the range of operation and data speed. In active and battery-assisted tags, the range and data speed is generally higher.

Tags can be combined with other electronic elements to sense and monitor temperature, strain, radiation, health information and others. Another possible application is to integrate RFID with other systems to active standby components when necessary, tracking and monitoring sensitive packages, storing impact and temperature data for example, monitoring patients at home and many other possibilities.

Example Non-Limiting Augmented Reality Technology

Augmented Reality (AR) is, generally speaking, a view of a physical, real-world environment where some elements are highlighted or augmented by computer generated imaging.

The computer generated imaging can include other elements or data, in real time, related to the real-world scene. Basically, Augmented Reality takes the existing view of the real world and superimposes onto it new computer-generated information. As a result, the technology increases the perception of the real-world view, adding peripheral information and possibilities of interaction.

Augmented Reality often uses hardware to capture the real-world images and plot additional elements, and software that recognizes scenes, processes the information and adds related elements on to real world images.

To recognize or track an object in a scene, there are basically two methods: Marker-Based Augmented Reality and Markless Augmented Reality. A marker-based AR system depends on the use of a marker in the scene to recognize the position of the scene. In the Markless Augmented Reality, any real-world element can be used as a target to interpret the scene and add related information. Either or both can be used herein.

Enhanced Monitoring of Structural Health Using AR

Example non-limiting technology herein provides enhanced monitoring of structural health in an integrated manner, associating efficient accesses of databases collected from sensor networks that are distributed in the structures where the information of detection of structural flaws and accidental damages are obtained. This provides quick user responses of augmented reality devices where RFID tags are installed in SHM sensors networks and in the AR mobile devices to simultaneously identify both user and sensor positions. Such arrangements can be used as tools for dynamic interaction, enabling improved inspection processes of structural maintenance actions. The present non-limiting example embodiments can surpass the existing technologies for inspection tasks available in the market, providing additional information and analysis to existing systems such as Integrated Vehicle Health Management (IVHM) and Health and Usage Management Systems (HUMS).

A system and method for damage detection for structural platforms using structural health monitoring can be integrated into an Augmented Reality system such that positions and locations of the structural platforms are simultaneously recognized by a transponder (non-limiting example: RFID tag) permitting a quick response of the results and consequent capability of providing better performance of the inspection process in the maintenance actions of the structural platform.

Using a sensory network based on a Structural Health Monitoring (SHM) system, the system informs damage assessment with maturity and robustness.

An example non-limiting output of the SHM system is damage characterization, which can be based on:

Detection;

Localization; and/or

Quantification (sizing)

After determining the characterization of the damage, an Augmented Reality System (AR) that may be independent or integrated with the SHM system is used to visualize the damage. The integrated AR provides a quick and easy evaluation of the structural integrity that provides benefits of reducing operational costs due to any combination of some or all of the items described below:

Overcome accessibility limitations;

Depth of hidden damage;

Eliminate costly and potentially damaging disassembly;

Minimize human factors with automated data analysis;

Reduce maintenance costs.

Like the structural component shown in FIG. 1, in the example non-limiting example, a transponder that identifies the system's SHM and AR capabilities start the process of both systems. Since the non-limiting SHM system senses the presence of damage, the non-limiting AR system performs a presentation of a viewing of representative images of the damage and of severity. In one non-limiting approach, these systems are independent but integrated, exchanging information (see FIG. 1).

In FIG. 1, a user viewing an AR system (which in this case is a handheld tablet, smartphone or other viewing device including a camera, RFID or other transponder, and gyro-sensor) can see both the "real view" of a structure and, superimposed on it, a virtual structural failure to provide an augmented reality view. The user may thus scan the structure to inspect it and look for defects. Upon the system detecting (using the camera, gyro sensor and/or transponder) from the position and orientation of the AR viewing system in 3D space that the user is looking at a portion of the structure the SHM system has determined is damaged, the system may superimpose a virtual indication of structural damage or failure at an appropriate position on a display of the AR system. Colorcoding, size, symbology and the like may be used to indicate to the user the type of damage, the severity of the damage, whether the damage is on the surface or deep within the structure, etc.

The technology may be embodied as a method, system hardware, embedded firmware and/or software as a whole product or as a set of parts that work together in order to achieve the same or other desired goals.

According to the flowchart of FIG. 2, a system and method supports a maintenance inspector during an inspection task to evaluate and visualize in real-time the detection of structural damage using a SHM system in a structural platform. Example non-limiting steps comprise:

A. Identification and recognition between the sensors network of the SHM system and of the AR device (see also FIG. 2A);

B. Structural Integrity Assessment (see also FIG. 2C);

C. Defining of position and location of the sensors network of the SHM system and of the AR device (see also FIG. 2B);

D. Visualization of the results in real-time (see also FIG. 2D-2H).

Phase A—Identification and Recognition Between the Sensors Network of the SHM System and of the AR Device (Ref. Also to FIG. 4)

In this step of the method, it has already been assumed that the transponders and the sensors of the SHM system are bonded on the surface of the structural component which will be the inspection object for detection of structural damage.

Moreover, it has already been considered that a database is provided with all the transponders associated with the sets of sensor networks of the SHM system, with the location of the transponder and each sensor (coordinate: x, y, z) relative to an origin point (coordinates: x, y and z equals zero) defined in the structural platform where the system is installed. In other words, it is desirable that transponders be used to locate the AR device (and the associated user) within the 3D coordinate system of the structure being inspected.

Also it has been considered that transponders are bonded to or otherwise affixed to or associated with the AR device in order to provide user location information relative to the structure being inspected.

The maintenance inspector starts a scan in the structural platform using AR device.

If there is no identification and recognition between the transponders bonded in the sets of SHM systems and in the AR device, then a real-time image of the structural surface only appears in the display of the AR device with no additional virtual objects indicating structure damage.

If there is identification and recognition between the transponders bonded in the sets of SHM systems and in the AR device, then transponders transmit preferentially a wireless signal performed through Bluetooth, a Wi-Fi network or other options. This starts the process of Phase B: Structural Integrity Assessment and Phase C: Defining of position and location of the sensors network of the SHM system and of AR device simultaneously.

Phase B—Structural Integrity Assessment

The start of the SHM system is performed by a transponder bonded near the sensor network. The process then activates the sensor network of the SHM system bonded in the structure.

Considering the sensors network of the SHM system, any one or all the sensors, acting as actuators, generate guided waves in the surface of the structural component to be inspected. Any one or all sensors, acting as receptors, receive the results after these guided waves propagate through the surface of the structural component (see FIG. 2B).

Figure 2B:
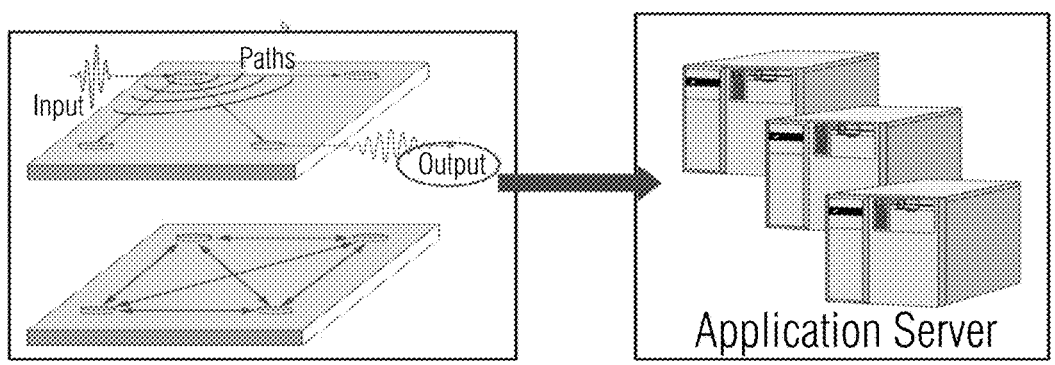
FIG. 2B shows an example action of the sensors of SHM system, as actuators or receptors and communication with an application server.
Figure 2C:
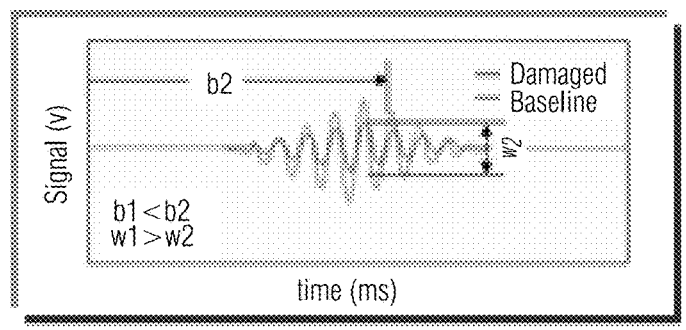
FIG. 2C shows an example of signal comparison between the baseline signature and a damage signature.

The action of the sensors of the SHM system, as actuators or receptors, can be performed in any one, or in all the sensors simultaneously, or in each sensor one by one or only in a unique sensor (see FIG. 2B).

The signals acquired by the sensors are then sent to an application server that can be integrated with the SHM system, or can be an application server that may be integrated to the AR system or can be an independent application server (see FIG. 2B).

These acquired signals are transmitted to the application server by wire or by wireless signal performed through Bluetooth, a Wi-Fi network or other options.

The signal processing algorithm is then applied to compensate dispersion effects acquired by guided waves due to the influence of some variables (e.g., environment temperature, complexity of the geometry of the structural component, etc.).

The database of the application server reads the acquisition of the signals acquired from all sensors of the SHM system after the time that the sensor network was bonded in the structural component, generating a signature with a condition without structural failure (herein called "baseline").

The system later considers the baseline signature with the compensation of the dispersion effects performed for a signal processing algorithm.

Several algorithms perform mathematical analysis comparing the differences between the signatures (baseline signature and the signature in real-time collected signals). These algorithms evaluate whether there is damage on the structural component (see FIG. 2C).

If there is structural damage, the SHM system performs other algorithms that calculate the location of this damage in relation to an origin point previously defined (e.g., Cartesian coordinates: x, y and z equals zero) and determine an estimate of the size, severity or other characteristics of this structural damage.

Figure 2D:
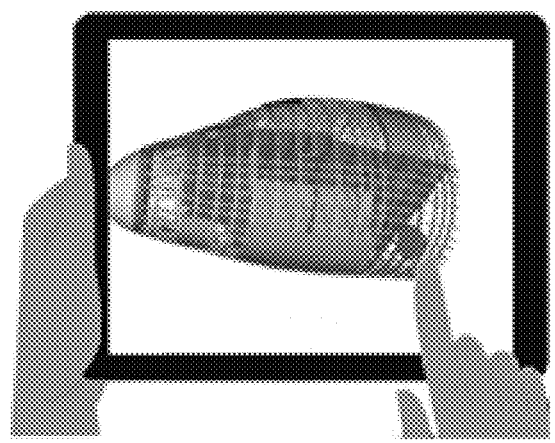
FIG. 2D shows example results of a communication between an application server and an AR system.

The results are sent from the application server for the AR System and can be transmitted or by wire or by wireless signal performed through Bluetooth, a Wi-Fi network or other options (see FIG. 2D).

Phase C—Defining of Position and Location of the Sensors Network of the SHM System and of the AR Device The start of the AR system is performed by a transponder bonded near the sensor network.

A 3D representation of the structural component is previously registered in the application server database.

The process identifies what is the sets of sensors of the SHM systems.

The process next extracts from the database, the information regarding the coordinates (x, y, z) of the SHM sensors system and a representative 3D model of the structural component.

Figure 2E:
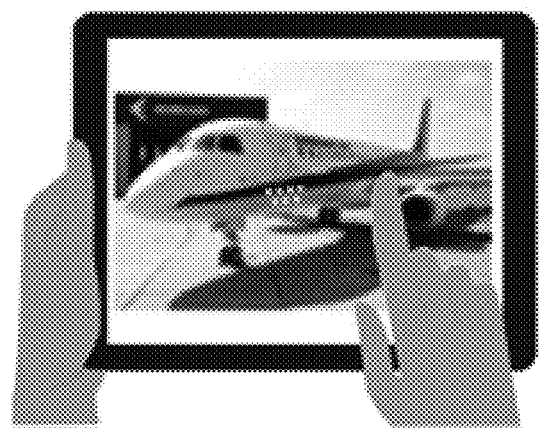
FIG. 2E shows example results of an action of an AR system defining users and sensors positions and relative positions therebetween.

Some algorithms of the AR system determine the user position and the SHM system position (see FIG. 2E).

Phase D—Visualization of the Results in Real-Time

Figure 2F:
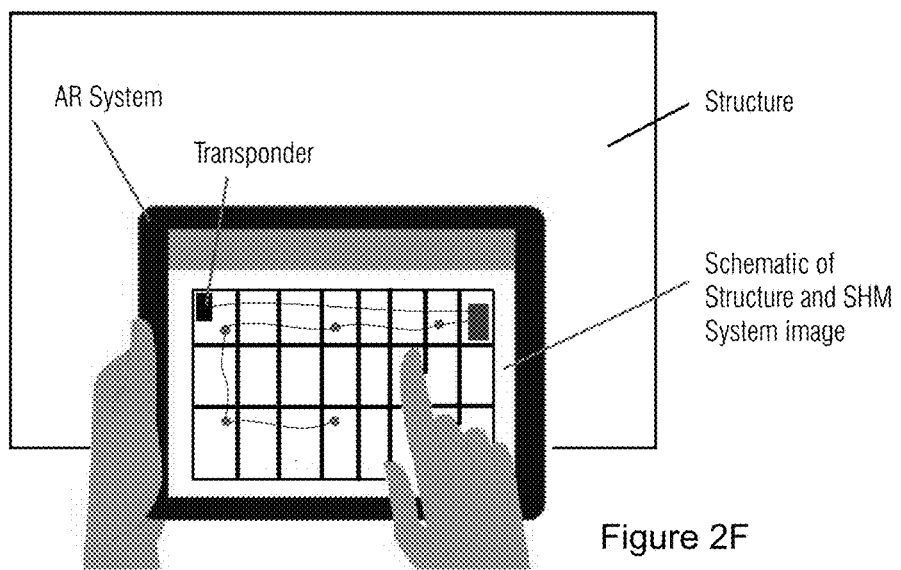
FIG. 2F shows example non-limiting viewing representative images in the AR System of the SHM system.
Figure 2G:
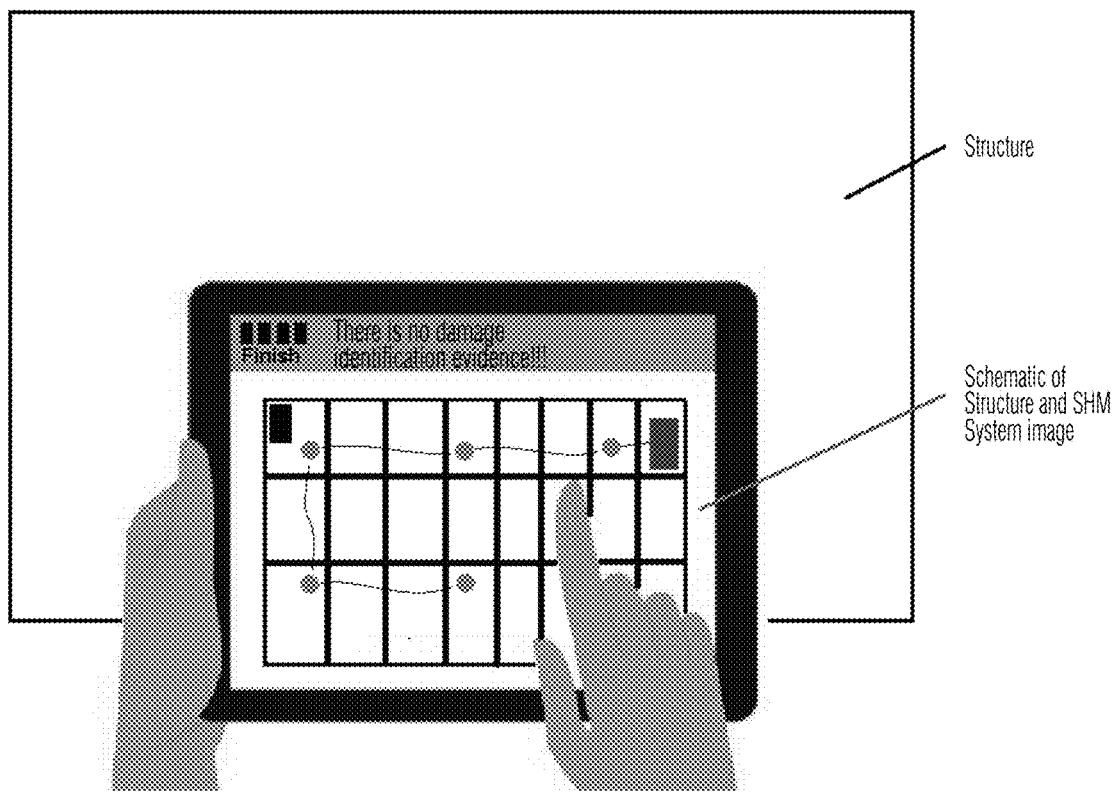
FIG. 2G shows example viewing representative images in the AR System of the SHM system without structural damage.
Figure 2H:
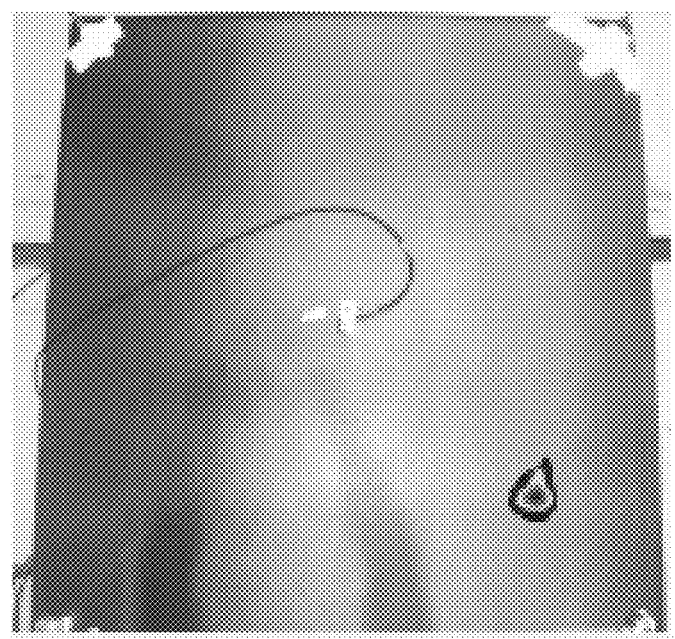
FIG. 2H shows example viewing representative images in the AR System of the SHM system with structural damage.

The AR System performs image processing with a view representative of the SHM system with sensor network and transponder in the structural component (see FIG. 2F).

If the SHM System does not find damage, the AR System performs image processing with a view representative of the SHM system with sensor network and transponder in the structural component including the message: "There is no damage identification evidence" (see FIG. 2G).

If SHM System finds damage, the AR System performs image processing with a view representative of the SHM system with sensor network and transponder in the structural component with a representative images of the damage and severity including the message: "There is damage identification evidence" (see FIG. 2H).

AR System includes an action to the user to confirm the inspection task executed. The AR System provides the user with information such as the results of inspection, date, system errors, etc. This information is stored in the external application server comprising a data bank of the maintenance plan.

As an example, for a detailed inspection of the longitudinal splices of the fuselage of an aircraft, it is desirable to perform a series of removals to get access to the actual structures, as indicated in FIGS. 3A-3C. After more than 50 hours of traditional detailed inspection of the example longitudinal splices of an aircraft, it is still desirable to reapply CIC (Corrosion inhibitor Compound), replace some components damaged during the process (Sound Dampeners) as well as re-install all insulation, bulkheads, panels and all monuments.

Using the SHM-AR system, no removals would be required for the inspection of the longitudinal splices. By walking through the main cabin of an airplane equipped with the SHM system proposed in this document, an operator with the AR device could inspect in less than an hour.

Once the transponder system identifies both the AR device with the operator and a nearby SHM sensors network, it will initiate an automatic integrity evaluation of the correspondent structure as well as indicate to the AR System the user and SHM locations. If there is any evidence of damage or degradation in the structure, the results of the SHM system will allow the AR device to generate a virtual representation of the damage and its severity (see FIG. 3D). Additionally, a message such as "Damage evidence identified" will be displayed. The same process would occur from inside the forward baggage comportment, completing the inspection of all longitudinal splices.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. Method of assessing the condition and obtaining a quick response of the results of inspection tasks in maintenance actions of a structural platform through use of a structural health monitoring system and a movable augmented reality display device, comprising:
   (A) with at least one processor, identifying and recognizing a sensors network of the structural health monitoring system and of the movable augmented reality display device;
   (B) with the at least one processor, assessing structural integrity of the structural platform in response to signals provided by the structural health monitoring system;
   (C) with the at least one processor, determining changing locations of the sensors network of the structural health monitoring system relative to the movable augmented reality device;
   (D) with the at least one processor, generating virtual graphical images of damaged structures internal to the structural platform in response to the determined changing locations and a 3D model of structures internal to the structural platform to provide virtual graphical views of internal structural damage from the changing perspectives of the moveable augmented reality display device; and
   (E) presenting a visualization on the augmented reality device display of the structural platform including virtual images of structural damage based on the assessed structural integrity, and the processor-generated virtual graphical images of internal structures in real-time response to the determined changing locations of the movable augmented reality device relative to the structural health monitoring system.

2. Method according to claim 1, further including associating transponders and the sensors of the structural health monitoring system already bonded on or affixed to or otherwise associated with the surface of the structural component which will be the inspection object, and transponders disposed on the augmented reality device.

3. Method according to claim 1, further including storing in memories of an application server an identification name and coordinate data defining the positions of the sensors of the structural health monitoring system and of the transponder.

4. Method according to claim 1, wherein the identification and recognition between the sensors network of the structural health monitoring system and of augmented reality device is performed between transponders bonded in the sets of structural health monitoring systems and in the augmented reality device through transmission of a wireless signal.

5. Method according to claim 1, wherein the structural integrity assessment is performed using the structural health monitoring system to automatically perform detection, location and a size estimate of structural damage to the structural platform and wherein the presenting presents, on the display device, virtual images of internal damage corresponding to the automatically performed detection, location and size estimate.

6. Method according to claim 5, further including before assessing the structural condition, acquiring signals and sending the acquired signals to and storing the acquired signals in an application server integrated with structural health monitoring system, or integrated with the augmented reality system or independent of the augmented reality and structural health monitoring systems.

7. Method according to claim 5, further including before assessing structural condition, acquiring signals and sending the acquired signals to an application server by wire or wirelessly.

8. Method according to claim 5, wherein before assessing a structural condition, performing a filtering of spurious signals.

9. Method according to claim 1, wherein said defining of location of the sensors network of the structural health monitoring system and of the augmented reality device is performed using augmented reality algorithms operating in conjunction with an application server database, said augmented reality algorithms using coordinates (x, y, z) of the structural health monitoring sensors system and a representative 3D model of a structural component.

10. Method according to claim 1, wherein presenting the visualization of structural damage assessment results in real-time is performed using algorithms of augmented reality technologies considering the information storage in an application server database generated by the assessing and the defining.

11. System for assessing condition and obtaining a quick response of the results of inspection tasks in the maintenance actions of a structural platform, comprising:
- a structural health monitoring (SHM) system comprising a plurality of transducers, including a plurality of sensors or pairs of actuators and sensors, a device to interrogate at least one of said sensors to produce signals, and software to perform analyses for damage identification;
- transponders comprising passive or active transducers;
- a portable device comprising a display window to view and edit images, videos, texts and spreadsheets with computing power to run 3D display with Augmented Reality, the portable device displaying on the display window virtual graphical views of internal damage identified by the structural health monitoring system in Augmented Reality from a perspective of the position and/or orientation of the portable device relative to the structural platform: and
- an application server comprising computing power and memories to store data.

12. The System according to claim 11, wherein the sensors comprise fiber optics sensors or piezoelectric sensors.

13. The System according to claim 11, wherein the structural health monitoring system uses Lamb waves or electromechanical impedance or fiber Bragg gratings or acoustic emission.

14. The System according to claim 11, wherein the plurality of sensors or pairs of actuators and sensors are embedded in the structure.

15. The System according to claim 11, wherein the communication between systems can be performed by wire or by wireless signals performed through of wireless technologies.

16. An inspection system for assessing and visualizing structural damage to a structural platform, comprising:
- sensors operatively coupled to or embedded in the structural platform that assess structural damage to or failure of the structural platform;
- a structural health monitoring processor operatively coupled to the sensors, the structural health monitoring processor determining structural damage in response to the sensors;
- at least one RF transponder and associated reader, the transponder and reader determining the position of the user augmented relative viewing device relative to the structural platform; and
- a graphics processor configured and structured to generate virtual graphical views of damage to structures internal to the structural platform in response to the determined relative position and assessed structural damage to or failure of the structural platform;
- the user augmented reality viewing device being operatively coupled to the structural health monitoring processor and/or a database associated therewith, the user augmented reality viewing device including a camera that captures images of the structural platform, the user augmented reality viewing device displaying real world images of the structural platform and in registry therewith, the graphics of the internal structural and internal virtual indications of determined structural damage by the structural health monitoring processor that are dependent on the position of the user augmented reality viewing device relative to the structural platform.

* * * * *